United States Patent [19]

Wade

[11] Patent Number: 4,840,773

[45] Date of Patent: Jun. 20, 1989

[54] DEODORANT DISPENSER

[76] Inventor: Leonard Wade, 11215 Cornish St., Lynwood, Calif. 90262

[21] Appl. No.: 229,002

[22] Filed: Aug. 5, 1988

[51] Int. Cl.⁴ .............................................. B60H 3/00
[52] U.S. Cl. .................................... 422/124; 98/2.11; 239/43; 239/57
[58] Field of Search ...................... 98/2.11, 105, 109; 239/37, 38, 43, 44, 57; 422/4, 124

[56] References Cited

U.S. PATENT DOCUMENTS

| | | | |
|---|---|---|---|
| 467,575 | 1/1892 | Force | 239/43 |
| 1,100,751 | 6/1914 | Lindstrom | 422/124 |
| 1,321,535 | 11/1919 | Marcovitz | 422/124 |
| 2,535,386 | 12/1950 | Brookins | 239/43 |
| 4,339,079 | 7/1982 | Sato et al. | 239/43 |
| 4,523,870 | 6/1985 | Spector | 239/57 X |

FOREIGN PATENT DOCUMENTS 355880 7/1922 Fed. Rep. of Germany ........ 239/37

Primary Examiner—Harold Joyce
Attorney, Agent, or Firm—Albert O. Cota

[57] ABSTRACT

A liquid scent deodorant dispenser which has a structural body (20) defining a fill cavity (22) in which a threaded stem closure (24) is rotatably positioned. A fill chamber (30) is in communication with the cavity, as well as a dispensing reservoir (34) and a wick (48) lining an air chamber (38). Liquid scent deodorant is placed in the fill cavity and enters the fill chamber and reservoir where the wick is saturated, allowing accelerated evaporation into a conditioned forced airstream of an automobile or building. The dispenser is attached to a grille or register by the use of either a "U" clip (54), an "S" clip (60), or parallel brackets (62).

12 Claims, 1 Drawing Sheet

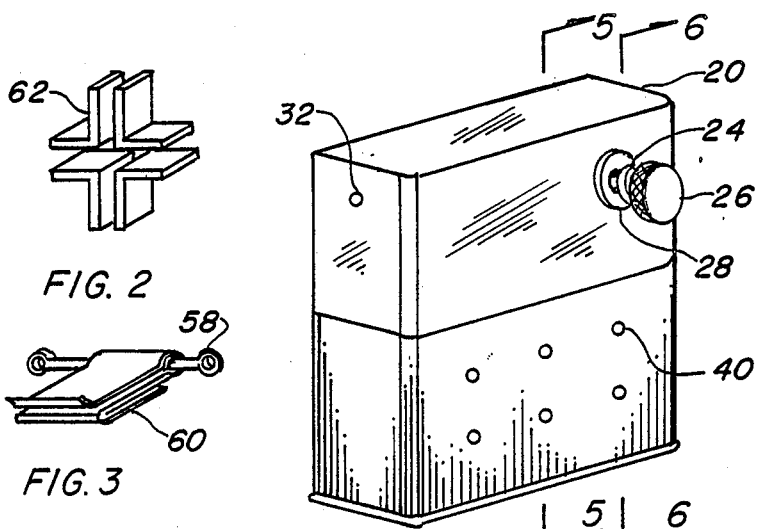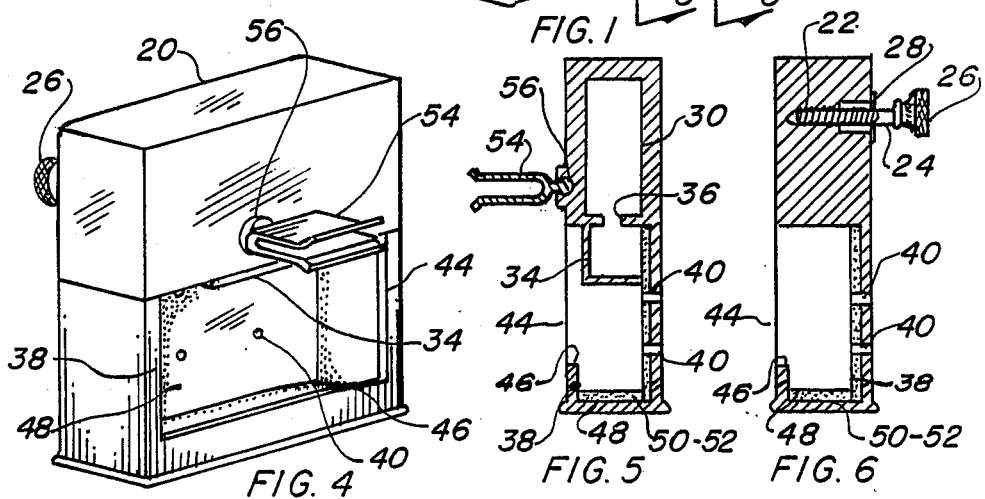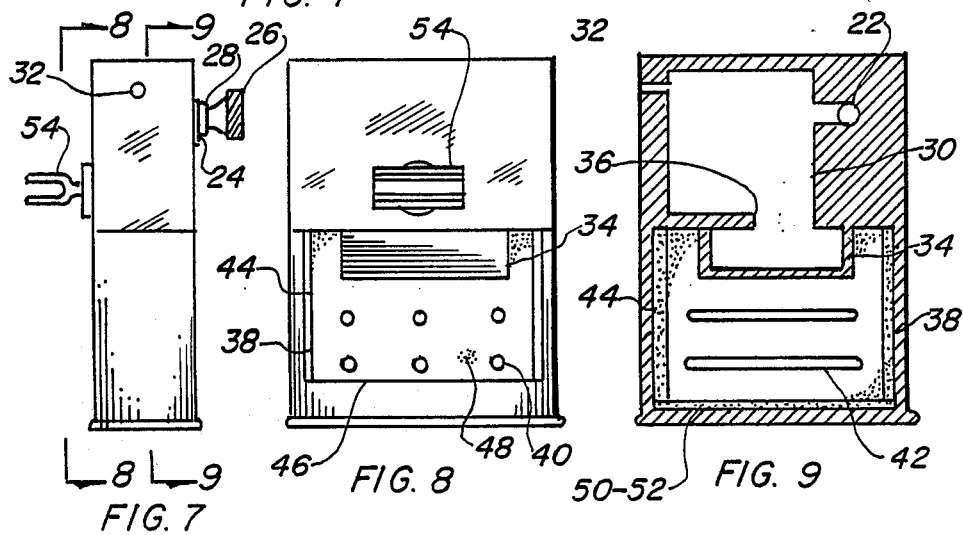

DEODORANT DISPENSER

TECHNICAL FIELD

The present invention relates to aroma dispensers in general, and more specifically to dispensers for evaporating liquid scent deodorant into a forced airstream, such as the air vent in the interior of an automobile.

BACKGROUND ART

Previously, many types of dispensers have been employed in endeavoring to provide an effective means to dispense deodorant into an airstream. For automobiles in particular cartridges using porous paper, plastic foams, or sponge-like material have been utilized located directly in the discharge air. Special ductwork in automotive air conditioners have been introduced allowing liquid scent to be distributed at convenient times. Spray devices have been employed that simply atomize the liquid into the atmosphere using a propellant or a manual pump.

A search of the prior art did not disclose any patents that read directly on the claims of the instant invention, however, the following U.S. Patents were considered related:

| U.S. Pat. No. | Inventor | Issue Date |
| --- | --- | --- |
| 4,677,902 | Takemasa | Jul. 7, 1987 |
| 4,523,870 | Spector | Jun. 18, 1985 |
| 3,722,185 | Gilbertson | Mar. 27, 1973 |
| 2,778,678 | Shields et al | Jan. 22, 1957 |

Takemasa teaches an automotive deodorizing device that opens a door at the exit of a deodorizer containing a volatile deodorant when a power switch is energized. This allows the scent to be diffused into the airstream and blown into the passenger compartment. A second mode switch is connected into the air conditioning power switch for driving the door open or closed, as required.

Spector utilizes an aroma-dispensing cartridge and holder assembly attached to the air vent in the interior of an automobile. When activated, the invention difuses a vapor into the forced airstream emitted from the vent into the interior. The device contains a replacable cartridge housed in a holder having parallel slots. The cartridge contains a porous pad impregnated with liquid scent and includes an array of slots. The slots are axially shiftable relative to the holder to regulate the process of vaporization.

Gilbertson employs a housing positioned on the rear window deck of an automobile having a filter on the inlet. A deodorant cup is positioned within the filter, deodorizing the air as it passes through the device. An electrically driven fan moves the air through the device. An optional purifying and deodorizing device may be adapted to supply outside air into the interior of the vehicle.

Shields et al direct their attention to a deodorant dispenser for use with the defroster of an automobile. The device is positioned against the inner surface of the windshield by fastening means in the form of a suction cup allowing circulation of air over a vaporization material in solid form, either a deodorant or perfumed type. The deodorant is housed in a hollow casing with space around it enabling air to circulate through a series of holes or perforations.

DISCLOSURE OF THE INVENTION

While prior art discloses various embodiments of deodorant dispensers for automotive and other uses they have been historically expensive, complex, and, in some cases, must be built into the vehicle itself, therefore, wide use and acceptance has not been enjoyed by these devices. Further, the use of cartidges of interchangeable odors requires special renewal components when the scent is evaporated and exhausted.

It is, therefore, a primary object of the invention to utilize a deodorant dispenser that is simple in construction, employs the air from the automotive air conditioning duct, or other source, and takes advantage of liquid deodorant of any type that is readily available on the market. This invention releases the volatile liquid in controlled volume when the air is passing through and when the airflow arises, the evaporation slows down to a greatly deduced level, not arbitrarily waisting the liquid when not required.

An important object of the invention is the simplicity of operation, as it is completely automatic, absorbing just the right amount of aromatic liquid and introducing it into the airstream by evaporation of the liquid, which in most cases utilizes an alcohol base with a low point of vaporization. This simple approach allows the prime mover of the air to vary the volume, since in most cases, the driver of the vehicle manually selects the speed of the air mover using a multi-speed motor, which in turn controls the volume of aromatic vapors dissipated directly into the air.

Another object of the invention provides ample storage within the reservoir to hold a sufficient quantity of liquid to be effective for a duration of time, convenient to the driver. As the device is removable, the operating life of a quantity of liquid deodorant may be extended by simply removing the invention from the air conditioner grille and storing it elsewhere, such as in the glove compartment.

Still another object of the invention allows easy filling of the liquid by removing the device from the air register or grille and unscrewing the threaded stem and simply pouring the liquid into the fill opening. No parts are touched that are in contact with the aromic fluid, as the stem contains an external knob and the bottle or container of the liquid, in most cases, has a simple removable cap. Reinstalling onto the air opening is easily accomplished by one hand maintaining the adeptness of refill.

Yet another object of the invention is the ease of manufacture, thus allowing cost effectivity creating a market for not only automotive use but also for stationary facilities, such as air ducts in homes, offices, factories, etc., or even mounted onto protective screens of domestic or industrial fans.

These and other objects and advantages of the present invention will becoe apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment shown from the front.

FIG. 2 is a view of the mounting means in the form of rigid parallel brackets completely removed from the invention for clarity.

FIG. 3 is a view of the mounting means in the form of a "S" clip completely removed from the invention for clarity.

FIG. 4 is a partial isometric view of the preferred embodiment taken from the rear.

FIG. 5 is a cross-sectional view taken along lines 5—5 of FIG. 1 illustrating the interior chambers and wick.

FIG. 6 is a cross-sectional view taken along lines 6—6 of FIG. 1 illustrating the interior chambers and wick.

FIG. 7 is a side view of the preferred embodiment.

FIG. 8 is a cross-sectional view taken along lines 8—8 of FIG. 7 illustrating holes in the air chamber.

FIG. 9 is a cross-sectional view taken along lines 9—9 of FIG. 7 illustrating slots in the air chamber.

BEST MODE FOR CARRYING OUT THE INVENTION

The best mode for carrying out the invention is presented in terms of a preferred embodiment. The preferred embodiment, as shown in FIGS. 1 through 9 is comprised of a structural body 20 that is in a rectangular shape made of a non-porous material, such that liquid may be contained therein. The body 20 may be made of any material suitable for the application with thermoplastic or thermoset material being preferred, such as acrylic, polycarbonate, polystyrene, polysulfone, polyester, phenolic, polypropylene, cellulosics, and the like. The upper portion of the body 20 may be transparent, however, this is not necessary for the invention, however, is desirable allowing visual indication of liquid levels and for convenience of filling.

The rectangular structural body 20 contains a fill cavity 22 in the upper portion on the front with a closure over the cavity. This cavity 22 is large enough to receive liquid scent deodorant from a storage vessel and the closure seals this opening. The closure may be of any of a myriad of types and styles well known in the art for containing and sealing liquids. The preferred embodiment is a removable threaded stem 24 with a knob 26 and a resilient seat 28 allowing liquid to be poured into the cavity 22 and sealing by the threading action of the stem 24 upon the body 20 and resilient seat 28. Other suitable closures include a removable threaded cap with a gasket, a snap-on gasketed cap, a separate removable plug or stopper, a twist lock cap, a pull out captivated plug with a slotted stem and inernal seat, a tapered bung, a rotating spigot or cock, a rotating stopper, and the like. As it is clearly seen, many types of the closures may function and operate equally well to accomplish the desired sealing purpose.

The body 20 further contains a fill chamber 30 that is in communication with the fill cavity 22 and is large enough to receive a quantity of liquid scent through the fill cavity 22 allowing operation for an optimum period of time. An air vent 32 emerges from the chamber 30 through the body 20 to atmosphere allowing displacement of air during the fill process. This chamber 30 simply acts as a receiving vessel for the liquid scent during initial filling. The fill chamber may be single or have a plurality of chambers interconnected therebetween with any number functioning equally well with the choice governed by the method of manufacture and type of material used. A dispensing reservoir 34 is positioned directly beneath the fill chamber 30 and has a passageway 36 therebetween allowing the liquid scent to flow freely into the reservoir 34. The reservoir 34 is enclosed on all sides, except one which is completely open. This open side is located between the body front 20 and the front of the reservoir parallel therebetween in a vertical position, allowing a large area for dispensing the scent.

An air chamber 38 is integrally formed within the body 20 and is located directly under and surrounding the reservoir 34. This positioning is best illustrated in FIGS. 5, 8 and 9. The chamber 38 contains a plurality of apertures through the body in the form of holes 40 or slots 42, depicted in FIGS. 8 and 9, respectively. These apertures are in a symmetrical array and allow air to pass freely therethrough, thus providing an extended surface within the dispenser. The chamber 38 further contains an opening 44 in the back of the body 20 almost the full width and at least large enough in height to expose the reservoir 34 on the top. This opening 44 continues almost to the bottom with the exception of a weir like barrier 46 on the lower portion having sufficient height to prevent overflow of liquid scent in the event the chamber becomes flooded. The position of the chamber 38 in the body 20 allows air to be blown into the chamber and dispersed from the apertures in the front under high velocity created by the reduction in open area.

A liquid absorbing wick media 48 lines the air chamber 38 and fills the open side of the reservoir 34. This wick media 48 is best depicted in FIGS. 5, 6, and 9 in cross-section and consists of either compressed felt material 50 or open cell sponge synthetic material 52, either one working equally well. The felt material 50 is normally formed of short natural fibers pressed together into a homogenious mass, well known in the art, and the open cell sponge 52 is blown with plastic and the cellular structure is not isolated, but in communication creating the ability to absorb moisture from one cellular space to the other. The wick media 48 is attached to the surfaces by bonding with glue or some other pressure sensitive adhesive, or is compression fitted employing the resilient nature of the media. The open side of the reservoir 34 and the inside of the air chamber 38 are spaced apart a distance slightly less than the thickness of the wick media 48, allowing a tight fit to be made by compression of the wick in order to create a liquid tight seal. In operation, the liquid scent deodorant is introduced into the reservoir 34 where the wick media 48 becomes saturated at the contiguous and open side, transferring the liquid by capillary action to the balance of the wick. The impingement of air across the surface of the media 48 hastens the evaporation process, allowing the aroma to be carried by the conditioned air into the interior of the vehicle or room. The holes 40 or slots 42 in the air chamber 38 also provide an extended surface for liquid evaporation, as air is flowing directly across the exposed edges.

The dispenser is fastened to the duct register of an automotive air conditioning system or a grille within a building or some other air moving surface by fastening means adapted for this type of configuration. Many types of clips or clamps may be utilized, such as a "U" clip 54, having a ball opposite an open end in U-shape and a socket 56 integrally formed in the body 20. This embodiment of the fastening means is depicted in FIGS. 4 and 7 and in cross-section in FIG. 5 allows the clip to freely move within the frictional limits of the union while grasping a blade of a register, etc., with the clip appertainances. The clip 54 may be oriented vertical, horizontal, or the like, and at any angular disposition to match the configuration of the grille. The "U" clip 54 may be any material having resistent qualities, such as steel, wood, plastics, composition material, or the like.

Another embodiment is illustrated detached from the dispenser in FIG. 3 and consists of a rod 58 upon which a resilient "S" clip 60 is rotatably mounted. The rod 58 is affixed to the body 20 allowing the "S" clip 60 to swivel axially from the body in order to align with appertainances in the airstream, such as registers or grilles. The combination is preferably metallic or a combination of a steel rod 58 and a plastic clip 60 is also acceptable.

Yet another embodiment is shown in FIG. 2 and consists of a plurality of rigid parallel brackets 62 extending from the body 20 such that appertainances in the airstream may be grasped and held securely therebetween. Both horizontal and vertical parallel extensions allow a choice of mounting, and the distance between the brackets governs gripping capabilities developed in this configuration. The brackets 62 may be integral, or added as a separate component as desired.

In operation, the threaded stem 24 is removed from the body 20 and liquid scent deodorant is poured into the fill cavity 22 where it enters the fill chamber 30 and dispensing reservoir 34. The liquid is then absorbed by the wick media 48. The stem 2 is replaced and the entire dispenser is attached to a blade of an air register in the conditioned airstream, by mounting means. Air impinged upon the wick 48 within the air chamber 38 accelerates the evaporating process of the liquid, expelling the aroma of the scent into the airstream.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A liquid scent deodorant dispenser for utilization within a forced airstream comprising:
    (a) a structural body having a front, rear, sides, top, and bottom, formed of non-porous material, with sufficient integrity to confine a liquid;
    (b) said body having a fill cavity with a closure therein positioned on the front;
    (c) said body having a fill chamber therein in communication with said fill cavity, also an air vent emerging from said body to atmosphere, the chamber receiving liquid scent from said fill cavity allowing sufficient quantity of liquid scent to be received within the dispenser;
    (d) a dispensing reservoir having an open side disposed beneath said fill chamber in the body, further having a passageway to the fill chamber such that liquid scent deodorant flows freely therebetween;
    (e) an air chamber integrally formed within the body under said reservoir having a plurality of apertures through the body front and an opening in the body back allowing air to pass from the opening through the apertures;
    (f) a liquid absorbing wick media, lining the air chamber and the open side of said reservoir absorbing the liquid deodorant to a point of saturation and transferring the aroma of the liquid scent to the airstream through the process of vaporization; and,
    (g) mounting means connected onto said body for fastening the dispenser to convenient appertainances in the airstream.

2. The deodorant dispenser as recited in claim 1 wherein said body is transparent in a least the portion containing said fill cavity and said fill chamber allowing visual indication of the amount of liquid scent stored therein.

3. The deodorant dispenser as recited in claim 1 wherein said fill cavity closure further comprises a removable threaded stem with a knob and a resilient seat allowing liquid to be poured into the cavity and sealing by the threaded action of the stem upon the body and seat.

4. The deodorant dispenser as recited in claim 1 wherein said fill chamber comprises a plurality of cavities interconnected therebetween.

5. The deodorant dispenser as recited in claim 1 wherein said air chamber apertures are holes completely through the body in a symmetrical array.

6. The deodorant dispenser as recited in claim 1 wherein said air chamber apertures are slots completely through the body in parallel relationship.

7. The deodorant dispenser as recited in claim 1 wherein said liquid absorbing wick media further comprises felt material formed of short natural fibers pressed together into a homogenous mass.

8. The deodorant dispenser as recited in claim 1 wherein said liquid absorbing wick media further comprises an open cell sponge material of synthetic composition having the ability to absorb moisture and transmit same to contiguous areas of the material.

9. The deodorant dispenser as recited in claim 1 wherein said mounting means comprise an open ended "U" clip having a swiveling ball opposite the open end and a socket integral with said body with the ball frictionally held within the socket such that the clip is free to move within the frictional limits of the union to grasp within the clip appertainances in any orientation within the airstream.

10. The deodorant dispenser as recited in claim 1 wherein said mounting means further comprise a rod upon which a resilient "S" clip is rotatably mounted with the rod affixed to the body allowing the clip to swivel axially from the body in order to align with appertainances in the airstream.

11. The deodorant dispenser as recited in claim 1 wherein said mounting means further comprise a plurality of rigid parallel brackets extending from said body such that appertainances in the airstream may be grasped and held securely therebetween.

12. A liquid scent deodorant dispenser for utilization within a forced airstream comprising:
    (a) a partially transparent body having a front, rear, sides, top, and bottom, formed of non-porous material, with sufficient integrity to confine a liquid;
    (b) said body having a fill cavity with a threaded stem closure positioned on the front;
    (c) said body having at least one fill chamber therein in communication with said fill cavity for receiving liquid scent from said fill cavity, also an air vent emerging from said fill chamber to atmosphere;
    (d) a dispensing reservoir having an open side disposed beneath said fill chamber in the body, further having a passageway to the fill chamber such that liquid scent deodorant flows freely therebetween;
    (e) an air chamber integrally formed within the body under said reservoir having a plurality of apertures through the body front and an opening in the body back allowing air to pass from the opening through the apertures;

(f) a liquid absorbing felt wick, lining the air chamber and the open side of said reservoir absorbing the liquid deodorant to a point of saturation and transferring the aroma of the liquid scent to the airstream through the process of vaporization; and, (g) an open ended "U" clip having a swiveling ball opposite the open end and a socket integral with said body with the ball frictionally held within the socket such that the clip is free to move within the frictional limits of the union to grasp within the clip appertainances in any orientation within the airstream.

* * * * *